(12) United States Patent
Miloslavsky et al.

(10) Patent No.: US 10,365,847 B1
(45) Date of Patent: Jul. 30, 2019

(54) CREATING AN OBJECT IN AN OBJECT STORAGE SUBSYSTEM FOR MANAGING PAGED METADATA

(71) Applicant: EMC Corporation, Hopkinton, MA (US)

(72) Inventors: Philip Miloslavsky, Ashland, MA (US); Matthew David Ivester, Cambridge, MA (US); David Shadmon, Newton, MA (US); Jeffrey Held, Milford, MA (US); Andrew Chanler, Berlin, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 605 days.

(21) Appl. No.: 14/491,400

(22) Filed: Sep. 19, 2014

(51) Int. Cl.
*G06F 3/06* (2006.01)
*G06F 12/1027* (2016.01)
*G06F 16/14* (2019.01)
*G06F 16/16* (2019.01)
*G06F 16/11* (2019.01)

(52) U.S. Cl.
CPC .......... *G06F 3/0644* (2013.01); *G06F 3/0619* (2013.01); *G06F 3/0631* (2013.01); *G06F 3/0643* (2013.01); *G06F 3/0665* (2013.01); *G06F 3/0679* (2013.01); *G06F 3/0689* (2013.01); *G06F 12/1027* (2013.01); *G06F 16/11* (2019.01); *G06F 16/14* (2019.01); *G06F 16/164* (2019.01); *G06F 2206/1014* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 8,285,967 B1* | 10/2012 | Veeraswamy | G06F 17/30091 707/821 |
| 2006/0080353 A1* | 4/2006 | Miloushev | G06F 17/30091 |
| 2009/0182939 A1* | 7/2009 | Hluchyj | H04N 21/23103 711/114 |
| 2010/0049755 A1* | 2/2010 | Best | G06F 3/0608 707/E17.01 |
| 2010/0211620 A1* | 8/2010 | Matsuzawa | G06F 12/0223 707/822 |
| 2011/0314071 A1* | 12/2011 | Johnson | G06F 17/30091 707/827 |
| 2013/0218847 A1* | 8/2013 | Saika | G06F 17/30194 707/692 |

* cited by examiner

*Primary Examiner* — Charles J Choi
(74) *Attorney, Agent, or Firm* — Anderson Gorecki LLP

(57) ABSTRACT

A storage array uses paged metadata. Each storage director has access to a plurality of object storage systems which describe locations of paged metadata in backing storage. Each object storage system includes different types of inodes which describe objects in backing storage. The object storage systems are used to locate and relocate metadata for loading into global memory, and creation and deletion of objects. An object storage system may be selected based on factors including ratio of different inode types, locality of object usage and anticipated object activity level.

16 Claims, 12 Drawing Sheets

CREATING AN OBJECT IN AN OBJECT STORAGE SUBSYSTEM FOR MANAGING PAGED METADATA

CROSS-REFERENCE TO RELATED APPLICATIONS

NA

BACKGROUND

Aspects of this disclosure are generally related to enterprise data storage systems. Examples of enterprise data storage systems include the Symmetrix family of storage array products of EMC Corporation. Enterprise data storage systems are used to maintain relatively large data sets and support a relatively large number of concurrent users. The data storage system typically includes multiple physical storage devices. The physical storage devices may be organized by technology type and arranged in hierarchical tiers based on performance. Users, e.g., applications and devices, can use the resources of the storage array by communicating with a host device. For example, the host device may be a server associated with an application such as a database for which data is maintained by the storage system, and the user may be a device which prompts database activity. The storage system provides storage virtualization by presenting logical storage devices to the host while maintaining the associated data in the physical storage devices.

SUMMARY

In accordance with an aspect, an apparatus comprises: a plurality of storage director devices which utilize one or more physical storage devices to present a logical storage device to at least one host device, each storage director device having access to a plurality of object storage systems in a global memory which is accessible to all storage director devices, the object storage systems describing locations of pages of metadata in at least one backing storage device, wherein each object storage system is associated with a fixed-size portion of the at least one backing storage device, and wherein each object storage system comprises one or more sets of inodes with pointers to locations in the fixed-size portion of the at least one backing storage device, and wherein one of the object storage systems is selected by one of the director devices to host an object based on sequential inode space availability in global memory and availability of space for pages of metadata in the associated portion the at least one backing storage device. In some implementations the director selects the object storage system from a plurality of candidate object storage systems which each have enough sequential inode space and space for pages of metadata to host the object. In some implementations a first type of inode includes a pointer to a single page and a second type of inode includes a pointer to multiple pages, and wherein the director weights the candidate object storage systems based on how many inodes of the first and second types are associated with each candidate object storage system. In some implementations the at least one backing storage device comprises at least one non-volatile storage device on each director device, and the director weights the candidate object storage systems based on likelihood of object access from a local backing storage device. In some implementations the at least one backing storage device comprises at least one non-volatile storage device on each director device, and the director weights the candidate object storage systems based on expected level of object activity such that balance of activity levels across backing storage devices is promoted. In some implementations the object is split into sub-objects. In some implementations the sub-objects are hosted by different object storage systems. In some implementations a director relocates the hosted object from an origin object storage system to a destination object storage system while allowing ongoing access to the object. In some implementations the director locks the origin object storage system to prevent inode addition, deletion and change in preparation for relocating the hosted object. In some implementations the director selects one inode at a time for relocation. In some implementations the inode selected for relocation is Read and Write locked. In some implementations the Read and Write lock is released after the inode is relocated. In some implementations the origin object storage system is unlocked after the hosted object is relocated.

In accordance with another aspect a method comprises: in a storage array having a plurality of storage director devices which utilize one or more physical storage devices to present a logical storage device to at least one host device, each storage director device having access to a plurality of object storage systems in a global memory which is accessible to all storage director devices, the object storage systems describing locations of pages of metadata in at least one backing storage device, wherein each object storage system is associated with a fixed-size portion of the at least one backing storage device, and wherein each object storage system comprises one or more sets of inodes with pointers to locations in the fixed-size portion of the at least one backing storage device, selecting one of the object storage systems to host an object by: calculating how many pages are required; calculating required sequential inode space; and selecting one of the object storage systems based on sequential inode space availability in global memory and availability of space for pages of metadata in the associated portion the at least one backing storage device. In some implementations the method further comprises selecting the object storage system from a plurality of candidate object storage systems which each have enough sequential inode space and availability of space for pages of metadata to host the object. In some implementations a first type of inode includes a pointer to a single page and a second type of inode includes a pointer to multiple pages, and the method further comprises weighting the candidate object storage systems based on how many inodes of the first and second types are associated with each candidate object storage system. In some implementations the at least one backing storage device comprises at least one non-volatile storage device on each director device, and the method further comprises weighting the candidate object storage systems based on likelihood of object access from a local backing storage device. In some implementations the at least one backing storage device comprises at least one non-volatile storage device on each director device, and the method further comprises weighting the candidate object storage systems based on expected level of object activity such that balance of activity levels across backing storage devices is promoted. In some implementations the method further comprises splitting the object into sub-objects. In some implementations the method further comprises hosting sub-objects in different object storage systems. In some implementations the method further comprises relocating the hosted object from an origin object storage system to a destination object storage system while allowing ongoing access to the object. In some implementations the method further comprises locking the origin object storage system to prevent inode addition, deletion and change in preparation for relocating the hosted object. In some implementations the method further comprises selecting one inode at a time for relocation. In some implementations the method further comprises Read and Write locking the inode selected for relocation. In some implementations the method further comprises releasing the Read and Write lock after the inode is relocated. In some implementations the method further comprises unlocking the origin object storage system after the hosted object is relocated.

In accordance with another aspect a method comprises: in storage system comprising a plurality of storage director devices which utilize one or more physical storage devices to present a logical storage device to at least one host device, each storage director device having access to a plurality of object storage subsystems in a global memory which is accessible to all storage director devices, the object storage subsystems describing locations of paged metadata in at least one backing storage device, each object storage subsystem being associated with a descriptive data structure that indicates availability of free space for paged metadata for that object storage subsystem in the at least one backing storage device, creating an object by: selecting at least one of the object storage subsystems from the plurality of object storage subsystems; allocating pages to inodes which include pointers to the at least one backing storage device; and updating the descriptive data structure. In some implementations the method further comprises updating a searchable data structure to indicate location of the selected object storage subsystem in global memory.

In accordance with another aspect a method comprises: in a storage system comprising a plurality of storage director devices which utilize one or more physical storage devices to present a logical storage device to at least one host device, each storage director device having access to a plurality of object storage subsystems in a global memory which is accessible to all storage director devices, the object storage subsystems including inodes describing locations of paged metadata in at least one backing storage device, each object storage subsystem being associated with a descriptive data structure that indicates availability of free space for paged metadata for that object storage subsystem in the at least one backing storage device, deleting an object by: determining on which of the plurality of object storage subsystems the inodes associated with the object are located; using pointers in the inodes associated with the object to identify corresponding bits in a storage level bitmap associated with the descriptive data structure; and clearing the identified bits. In some implementations the method further comprises updating the descriptive data structure to indicate that the object has been deleted.

DETAILED DESCRIPTION

For the purposes of this description a block of storage is 512 bytes, a track is 64 KB, and a cylinder includes 15 tracks. However the concepts described herein are not limited to such conventions. Furthermore, all examples and features mentioned below can be combined in any technically possible way.

Figure 1:
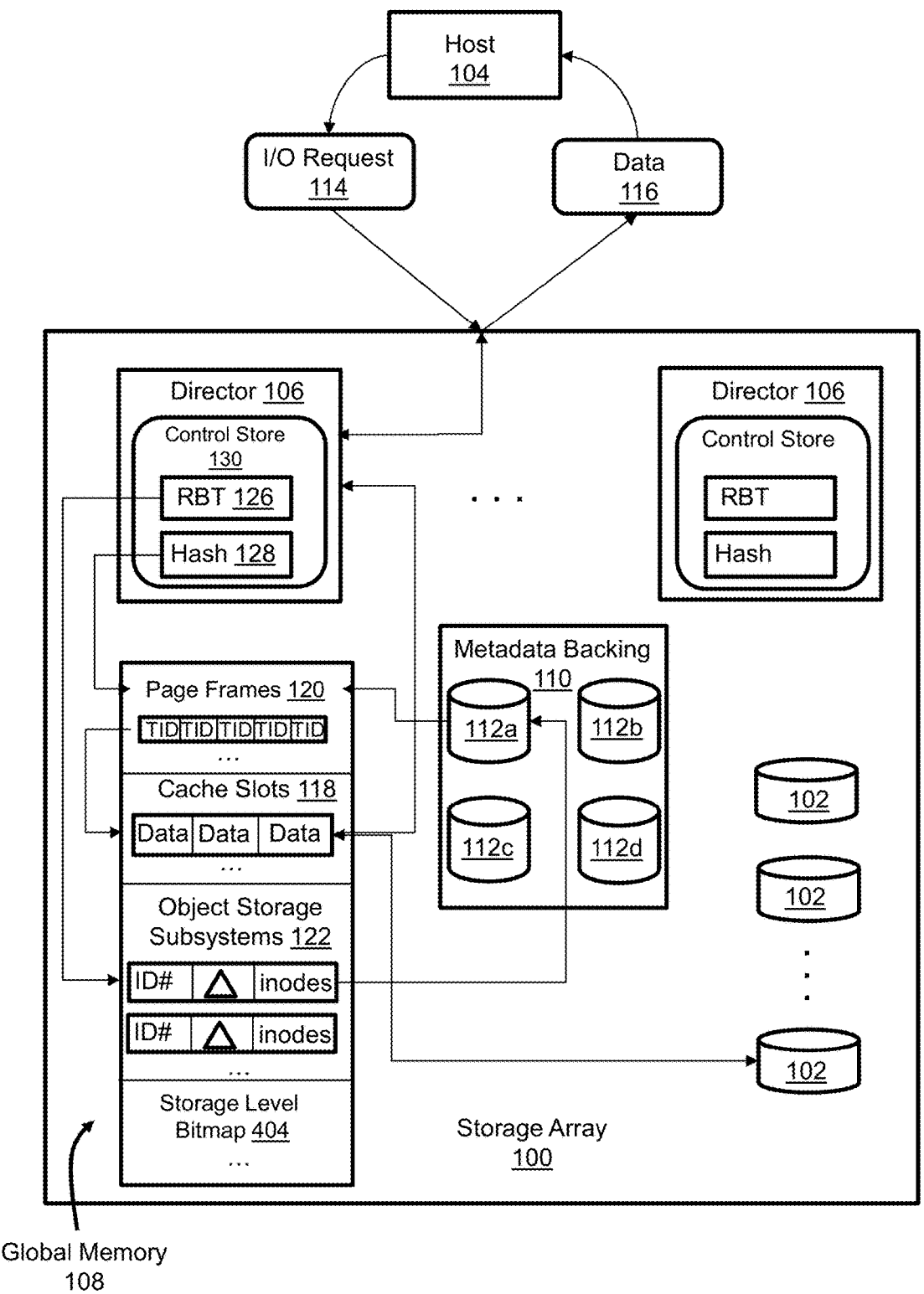
FIG. 1 illustrates a storage array suitable for operation in a network "cloud" environment.

FIG. 1 illustrates a storage system in a network "cloud" environment. A storage array 100 maintains data on physical storage devices 102 and supports a large number of concurrent users. Examples of physical storage devices 102 that may be used in the storage array include but are not limited to SSDs (solid state drives, e.g., flash) and HDDs (hard disk drives, e.g., with spinning magnetic media). Computing devices such as user terminals and servers use the data maintained in the storage devices 102 by communicating with the data storage array 100 via a host device 104. Elements of the storage array 100 include a plurality of directors 106, a global memory 108 and metadata backing storage 110. Each director 106 may be a separate hardware subsystem. The directors may operate in parallel such that I/O requests are concurrently serviced and the failure of one director does not cause the failure of other directors. The global memory 108, which is illustrated as a single logical memory resource, could be implemented in multiple physical memory devices, e.g., multiple RAM (random access memory) components, which may be distributed across multiple physical devices, e.g., on the directors 106. The metadata backing storage 110, which is illustrated as a set of four logical storage devices 112a, 112b, 112c, 112d, could also be distributed across the directors 106, e.g., up to four separate SSDs on each director.

The directors 106 service I/Os and provide storage virtualization for the host 104. From the perspective of the host, the data is stored on one or more logical storage devices which are presented by the directors. The directors use the physical storage devices 102 to maintain the data associated with the presented logical devices. Each director 106 includes an interface for communicating with the host 104, e.g., for sending, receiving, or sending and receiving an I/O request 114 and data 116 associated with I/Os. It should also be understood that the directors 106 utilize metadata that is paged to save space. A cache slot section 118 of global memory 108 is used to temporarily store selected data such that it can be accessed by a director 106 directly from the global memory rather than the storage devices 102. The global memory 108, e.g. RAM, has better data access performance characteristics than the storage devices 102, e.g. SSDs/HDDs, although these specific technologies should not be viewed as limiting. Data initially read from the storage devices 102 in response to a hint or an I/O request 114 by the host 104 is copied to cache slots 118 in the global memory. The cache slots have a fixed size, e.g., 64 KB. When data is requested that is in the cache slots then that cached copy is used to service the I/O request. When data is requested that is not in the cache slots then that data is copied from the storage devices 102 into the cache slots 118. Generally, data that has not been accessed recently or within a predetermined period of time may be flushed from global memory 108 and written to the storage devices 102. Again, however, data paging is not directly related to the present disclosure.

Metadata maintained by the storage array indicates, among a variety of things, where data is located. Consequently, metadata is utilized for servicing I/Os and to facilitate data paging. The metadata may include TIDs (track ID tables) in global memory 108 which include pointers to the data in the cache slots 118. The TIDs are maintained in fixed-size page frames 120, e.g., 4 KB, where each page frame holds multiple TIDs. The inventors have recognized that the trend of increased storage capacity of storage systems has led to an increase in the amount of metadata to be maintained. Furthermore, maintaining all of the metadata for the storage system in costly high performance volatile memory increases the overall cost of the storage system. In accordance with one aspect the illustrated storage array implements metadata paging utilizing less costly metadata backing storage 110 such as SSDs. Consequently, only a subset of metadata needs to be present in global memory 108 at any given point in time, and therefore less RAM is required. This may be advantageous because SSD storage has a lower cost per bit than RAM. However the concepts are not limited to these specific storage technologies and are generally applicable to any storage technologies for which there is a cost per bit differential. Aspects of metadata paging are described in greater detail below.

Figure 2:
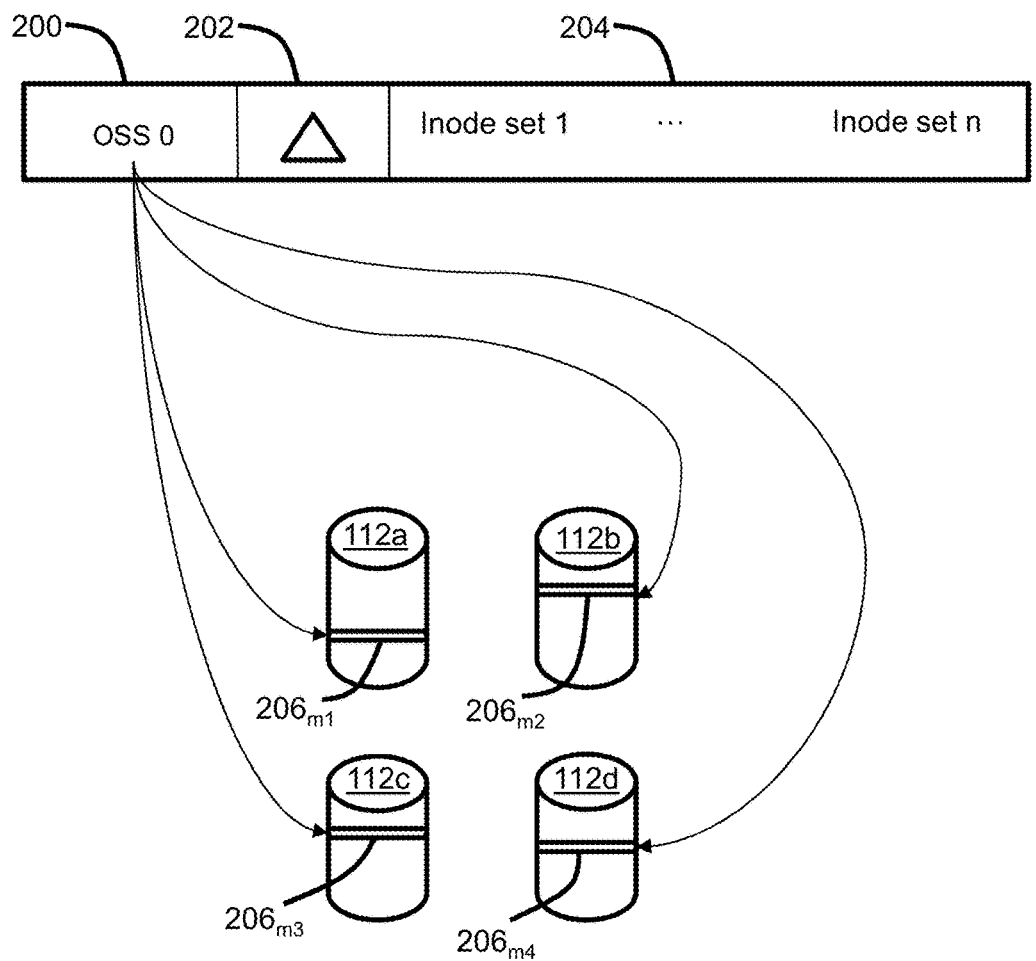
FIG. 2 illustrates a System Maintained Object Storage Subsystem.

Referring now to FIGS. 1 and 2, one aspect of metadata paging in a storage array which supports many concurrent users is use of multiple devices represented on multiple OSSs (System Maintained Object Storage Subsystems). The multiple OSSs are maintained in a section 122 of the global memory 108. Each OSS, e.g., OSS 0 (FIG. 2), includes a unique OSS identification number 200, a hierarchical data structure 202 ("pyramid"), and one or more sets 204 of inodes (predictable size object location and state nodes). Each OSS is uniquely associated with a corresponding metadata backing slice (hereafter "Slice") in metadata backing storage 110, e.g., OSS 0 (FIG. 2) is associated with Slice 206. The Slices may have a fixed-size, e.g. 20 GB. The Slices may also be mirrored, e.g., three or four mirrors which are shown in FIG. 2 as mirrors $206_{m1}$, $206_{m2}$, $206_{m3}$ and $206_{m4}$. Mirrors may be located on the same storage device, e.g., device 112a, different storage devices, e.g., 112a and 112b, and also possibly on different directors. The mirrored Slices need not be at the same location in each storage device in which they are stored. Within the mirrors $206_{m1}$, $206_{m2}$, $206_{m3}$ and $206_{m4}$ the TIDs are maintained in a "compressed" form which differs from the uncompressed form of TIDs in global memory 108. More particularly, there may be data compression and additional information such as state may be included when the TID is uncompressed in global memory.

Figure 3:
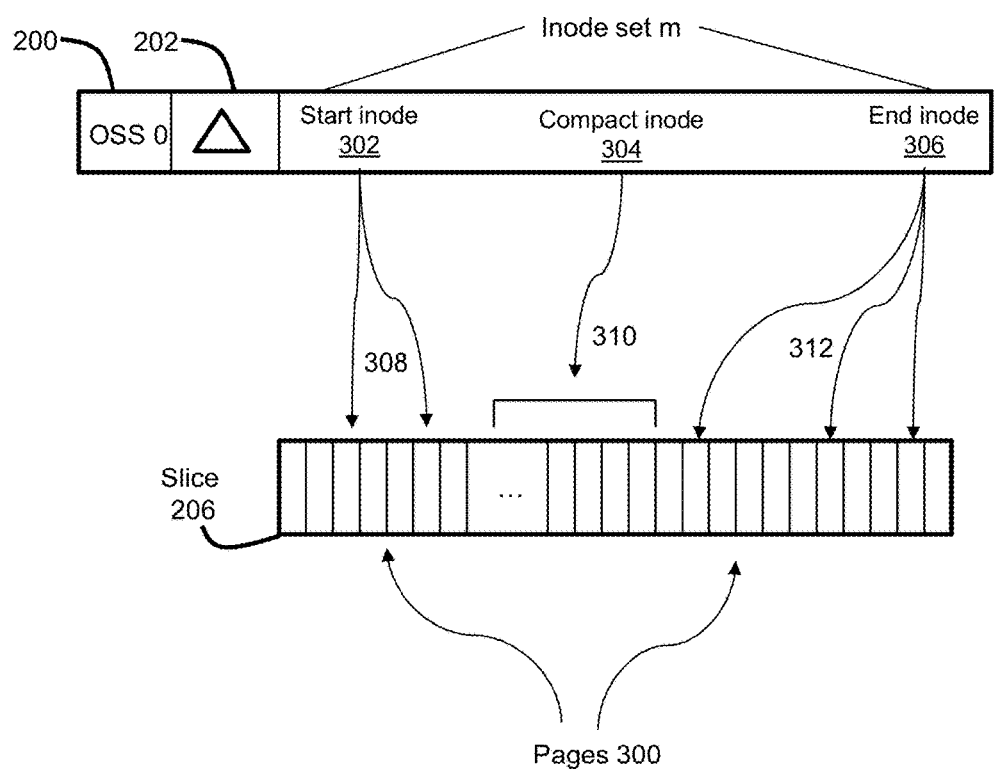
FIG. 3 illustrates the relationship between an inode set and paged metadata.

Referring now to FIGS. 1 and 3, the inode sets of exemplary OSS 0 indicate the locations of TIDs associated with that OSS within the mirrors corresponding to the OSS identification number 200. For example, inode set m of OSS 0 indicates locations of TIDs in Slice 206 (and thus mirrors $206_{m1}$, $206_{m2}$, $206_{m3}$ and $206_{m4}$, FIG. 2). Each inode set includes one or more types of inodes of various types which include pointers to fixed-size pages 300, e.g., pointers to the 4 KB pages of the 20 GB Slice. The inode types in the illustrated example include a Start inode 302, a Compact inode 304, and an End inode. The Start inode 302 indicates the start of an inode set, e.g., inode set m. The Compact inode 304 efficiently references a relatively large number of pages 300. The End inode 306 efficiently references a relatively small number of pages 300. The inode set is stored in sequential locations in global memory. Further, each pointer in an inode references a sequentially addressed area of the Slice 206. However, the pages referenced by the different pointers and inodes of the set need not be sequential within the Slice. Aspects of the different types of inodes are described in greater detail below.

An inode set includes only one Start inode 302. The Start inode indicates the start of an inode set and can be located via a descriptive data structure such as a RBT (red black tree) 126 (FIG. 1), although a wide variety of data structures could be used. Because an inode set is stored in sequential locations in global memory, the complete inode set may be located by finding the Start inode of the set. Further, it may be possible to obtain an index based on the TID sequence number in a constant (as the term is understood in O(n) terminology) amount of time to any inode of the object. The Start inode contains pointers to up to a predetermined number of pages 300, e.g., pointers to up to 32 of the 4 KB pages in the 20 GB Slice 206. Two pointers 308 are shown in FIG. 3. The number of pages being referenced, e.g., 1-32, is indicated in a field in the Start inode.

The inode set includes any number of Compact inodes 304, including possibly zero Compact inodes. Each Compact inode includes at least one pointer 310 to a relatively large number of pages in the Slice, e.g., a single pointer to 128 of the 4 KB pages. The number of multi-page pointers in a Compact inode is an implementation choice. Compact inodes facilitate time-efficient allocation and de-allocation.

The inode set includes any number of End inodes 306, including possibly zero End inodes, but not a number that would reference a number of pages which would exceed the number of pages referenced by a Compact inode. The End inode 306 contains pointers to up to a predetermined number of pages, e.g., pointers to up to 32 of the 4 KB pages in the 20 GB Slice. Three pointers 312 are shown in FIG. 3. The number of pages being referenced is indicated in a field in the End inode. If a Compact inode references 128 pages and an End inode references up to 32 pages then the inode set would have no more than four End inodes because four End inodes would reference up to 128 pages. End inodes facilitate space-efficient allocation and de-allocation.

The illustrated inode set (inode set m in FIG. 3) with one inode of each type could reference up to 192 pages (32+128+32). If 1000 pages were required for a device then the inode set would include one Start inode, seven Compact inodes, and three End inodes (with pointers to 32, 32 and 8 pages respectively). However, the exemplary numbers of pages referenced by each type of inode should not be viewed as limiting and other powers of two could be implemented.

Figure 4:
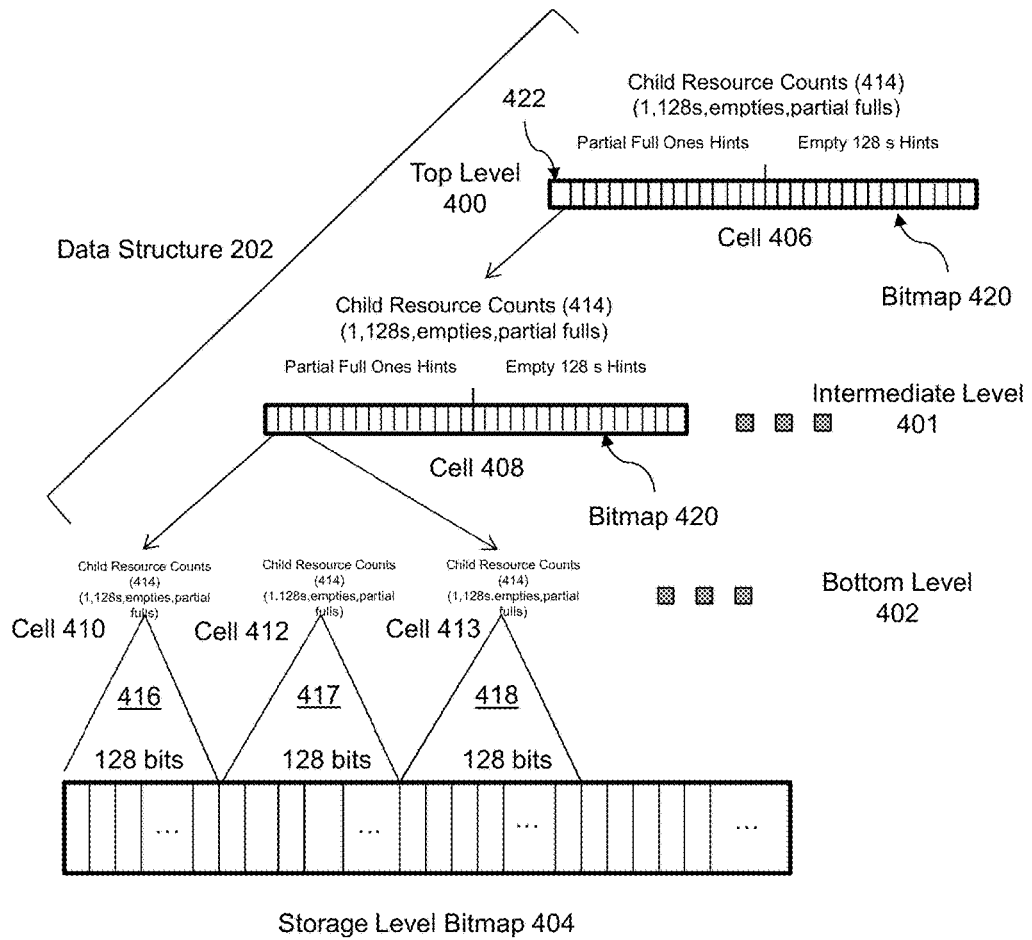
FIG. 4 illustrates a pyramid data structure which describes a storage level bitmap of paged metadata.

Referring now to FIGS. 1, 2 and 4, the pyramid data structure 202 corresponding to an OSS describes a storage level bitmap 404 corresponding to the Slice associated with that OSS. In other words, each bitmap 404 represents the fixed-size, e.g., 20 GB, Slice 206 associated with the OSS ID 200, e.g., a 32 Kb bitmap. The data structure 202 includes multiple cells organized in multiple levels, e.g., cell 406 at the top level 400, cell 408 at an intermediate level 401, and cells 410, 412 and 413 at the bottom level 402. At the bottom level 402 each cell describes a respective fixed-size, e.g., 128 bit, region of the bitmap 404. For example, cell 408 describes region 416, and cell 413 describes region 418. The cells at every level include counters 414 which indicate child resource counts of all related child cells at levels below that cell, i.e., the sum the child counters within a family. The bitmap 404 is organized as 128 bit regions 416, 417, 418, etc., where each bit corresponds to a page in the Slice. The counters indicate the number of bits clear in partially full 128 bit regions, the number of 128 bit regions that are clear, the number of 128 bit regions that are full, and the number of 128 bit regions that are partially full. The cells at all levels other than the bottom level 402 also include hints to where the partial full 1 s (single free pages in a region with at least one page taken) and empty 128s (a region in which all 128 pages are free) are located. The hints are a bitmap 420 of the child cells at the next lower level. For example, if the leftmost location 422 in the bitmap of cell 406 corresponds to the leftmost child cell 408 at the next lower level then the partial full is hint would indicate whether that child cell had single free pages. Similarly, the empty 128s hint would indicate whether the child cell 408 had 128 sequential free pages. The fanout of the pyramid data structure 202 is an implementation choice, but the illustrated example includes 16 child cells for each parent cell. The cells at the bottom level 402 of the pyramid data structure include only counters corresponding to the respective 128 bit regions of the bitmap which the cells describe. It should be noted that although only three levels are illustrated, many more levels may be implemented in practice. As will be explained in greater detail below, the pyramid data structure facilitates timely evaluation of available free pages in the Slice and also helps to locate and allocate those pages.

Having described the architecture of the storage system, various procedures which may be implemented in that architecture will now be described. The procedural steps need not necessarily be performed in the order in which they are shown in the illustrated examples.

Figure 5:
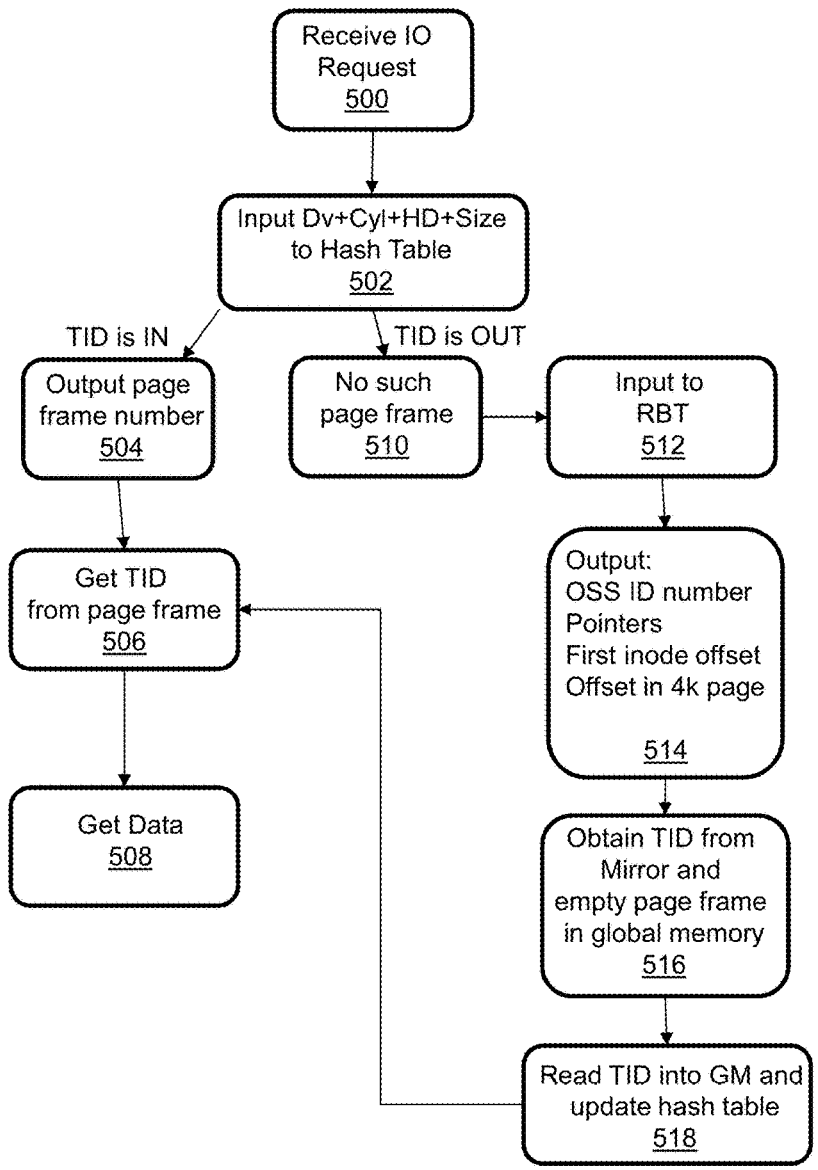
FIG. 5 illustrates a procedure for servicing an I/O.

Referring now to FIGS. 1 and 5, the procedure for finding and utilizing a TID to satisfy an IO request 114 varies depending on whether the TID is present in global memory 108. A director 106 determines various information from an IO request 114 received in step 500. In order to determine corresponding TIDs the director inputs the device number, cylinder number, head (track) and size to a hash table 128 maintained in a control store 130 of the director as indicated in step 502. It will be appreciated that a wide variety of descriptive data structures could be used, of which a hash table is simply one example. The hash table 128 indicates the locations of TIDs in pages frames 120 in global memory 108. If there is an entry in the hash table corresponding to the inputted information then the TID is IN global memory. In that case, i.e., a cache hit, the hash table outputs a corresponding page frame number as indicated in step 504. The page frame number outputted by the hash table is used to locate the page frame holding the TID in global memory. The TID is obtained from global memory as indicated in step 506 and used to find the cache slot associated with the IO, thereby finding the user data in global memory as indicated in step 508. In the case of a Read IO the data could then be returned in response to the IO request.

If there is not an entry in the hash table 128 corresponding to the inputted information then the TID is OUT of global memory. In that case, i.e., a cache miss, the hash table outputs an indicator that there is no such page frame referenced in the hash table as indicated in step 510. The director then inputs the information (device number etc.) to the RBT 126 (red black tree) maintained in the control store as indicated in step 512. The RBT outputs a OSS ID number, pointers to Slice mirrors, offset of the first inode, and offset in the 4 k page as indicated in step 514. The TID is then obtained from one of the identified mirrors using the outputted information and an available page frame is obtained in global memory as indicated in step 516. The TID is then copied into the obtained page frame and the hash table is updated to indicate that the TID is now IN as indicated in step 518. The TIDs are not necessarily stored in an order which corresponds to the order in which the data is located in the device itself. Rather, any page frame may hold any TID. The TID in global memory is used to obtain the data as already described above.

Figure 6:
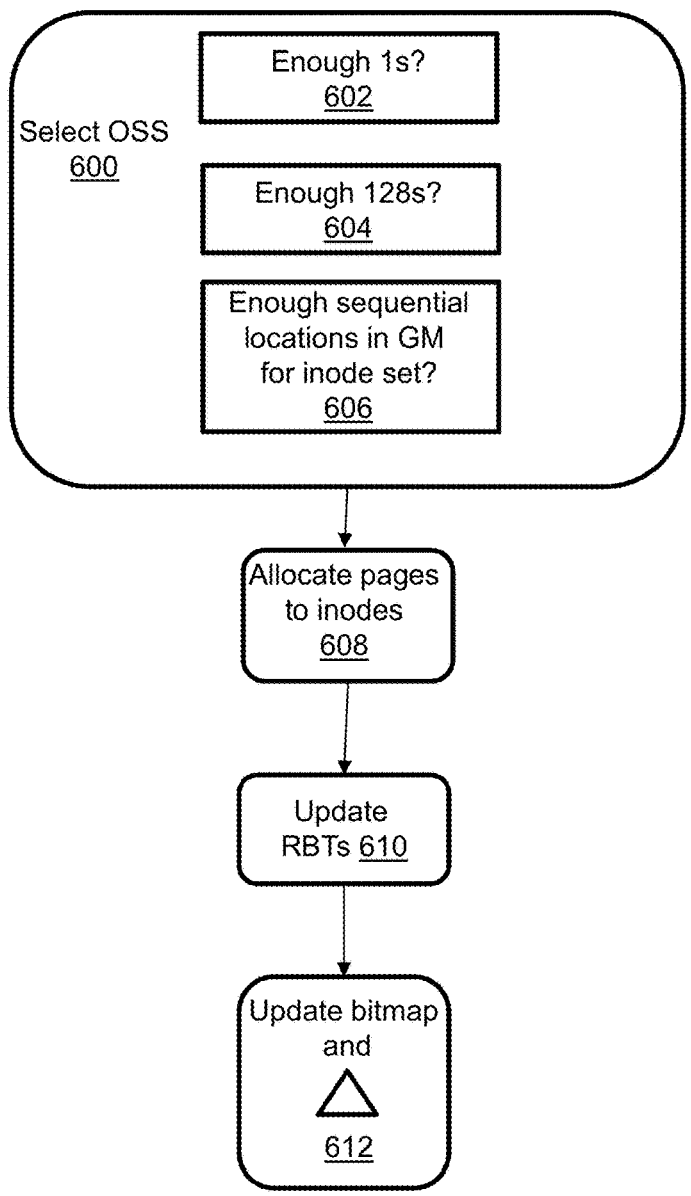
FIG. 6 illustrates an object create procedure.

FIG. 6 illustrates an object create procedure. The procedure could be used in a variety of situations including but not limited to device creation. The first step 600 is to select a suitable OSS. Selecting a suitable OSS can include checking for a sufficient number of empty is (step 602) and empty 128s (step 604) in the associated Slice in the metadata backing storage devices. This information can be determined from the counts at the top levels of the pyramid data structures associated with the OSSs. Selecting an OSS can also include checking for sufficient sequential free space in global memory to host the inode set as indicated in step 606. Once a suitable OSS has been selected, pages are allocated to the inodes as indicated in step 608. The RBT, which is a shared data structure with local copies on each director, is then updated in step 610 to indicate where the paged metadata will be located. The bitmap (404, FIG. 4) and pyramid data structure (202, FIG. 4) are updated in step 612 to indicate changes associated with the allocation.

Figure 7:
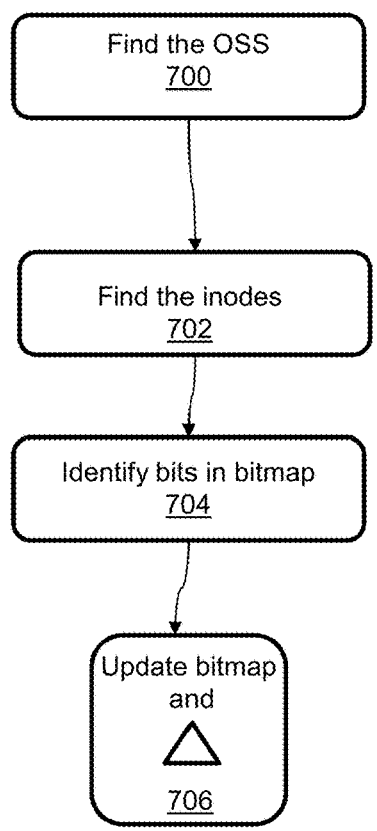
FIG. 7 illustrates and object delete procedure.

FIG. 7 illustrates an object delete procedure. In order to delete an object the director finds the OSS on which the object's inodes are located as indicated in step 700. The director then finds the inodes in that OSS which correspond to the object being deleted as indicated in step 702. The pointers in those inodes are used to identify corresponding bits in the storage level bitmap as indicated in step 704. Those bits are then inverted/cleared and the pyramid data structure is updated as indicated in step 706.

Figure 8:
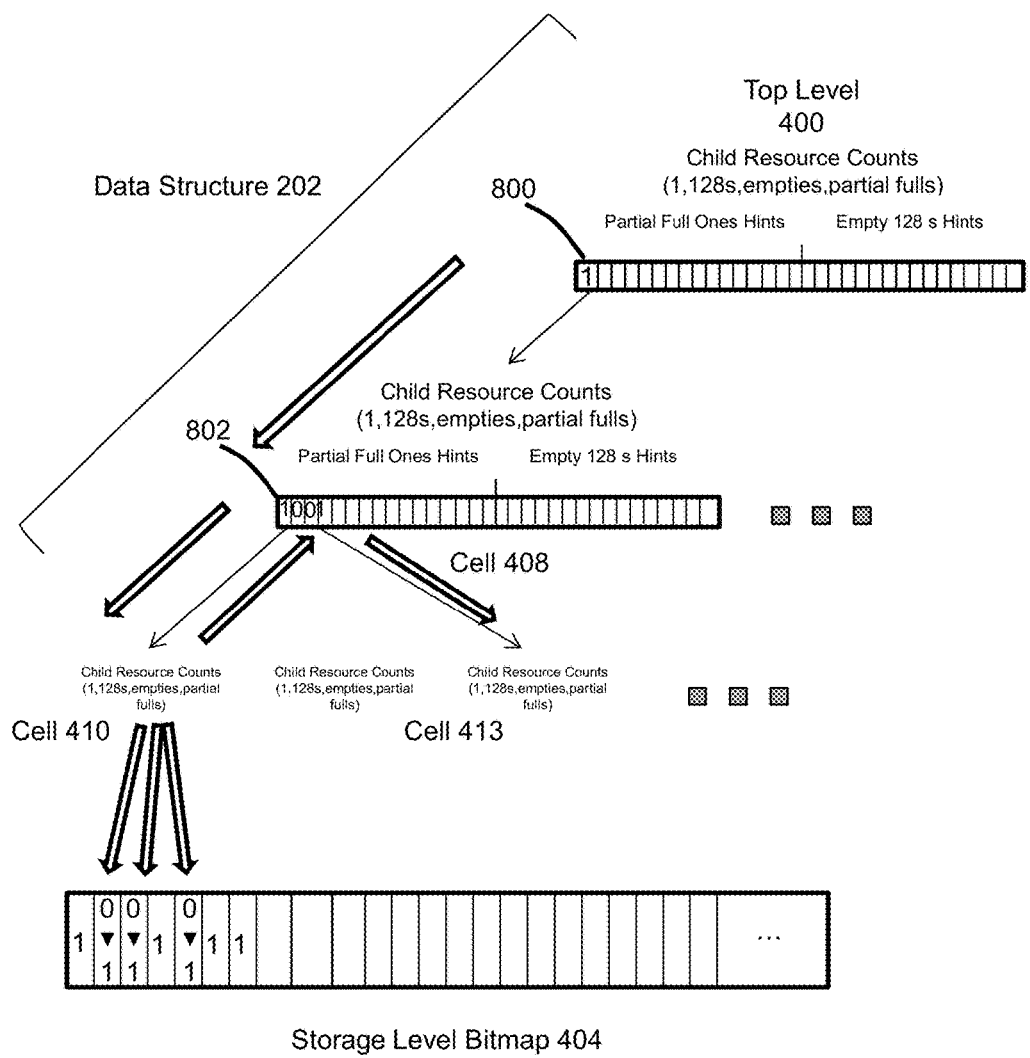
FIG. 8 illustrates use of the pyramid data structure for allocation.

Referring to FIG. 8, the pyramid data structure 124 may be used to allocate pages in flash referenced by inodes. Hints provide guidance for searching through the pyramid data structure to locate cells with the required free is (single pages) and 128s (128 sequential pages). More particularly, partial full is hints are used to find single pages for Start and End inodes, and empty 128s hints are used to find 128s for Compact inodes. In accordance with one technique, starting at the top level 400 in the hints corresponding to the sought resources, e.g., 1s or 128s, the leftmost positive hint is followed. For example, if 7 1s are sought then the leftmost hint 800 indicating partial full 1 s at a lower level cell is followed. The leftmost positive hint 802 at the corresponding child cell 408 is then followed. In the simplified and truncated three level pyramid data structure this leads directly to the bottom level cell 410 from which the resources are allocated by updating the corresponding 128 kb region of the storage level bitmap. In particular, the three available 1's are allocated by updating the bitmap 404, e.g., by inverting the bits corresponding to free spaces. The remaining sought four 1 s are obtained by further searching through the pyramid data structure, e.g., by iteratively going up one level (to cell 408) and to the right and then down to the lowest level, at which point resources are allocated. If the resources are not available at a cell then the search proceeds to the right sibling cell. If resources are not available from any sibling cell at a level then the search proceeds up one level and to the right. In other words, families of cells may be sequentially searched. For example, after consuming the free 1s from cell 410 it is determined that cell 412 does not have free 1s and then that cell 413 has free 1s as indicated by searching through the cell 408 hints from left to right. However a wide variety of allocation algorithms could be utilized.

Figure 9:
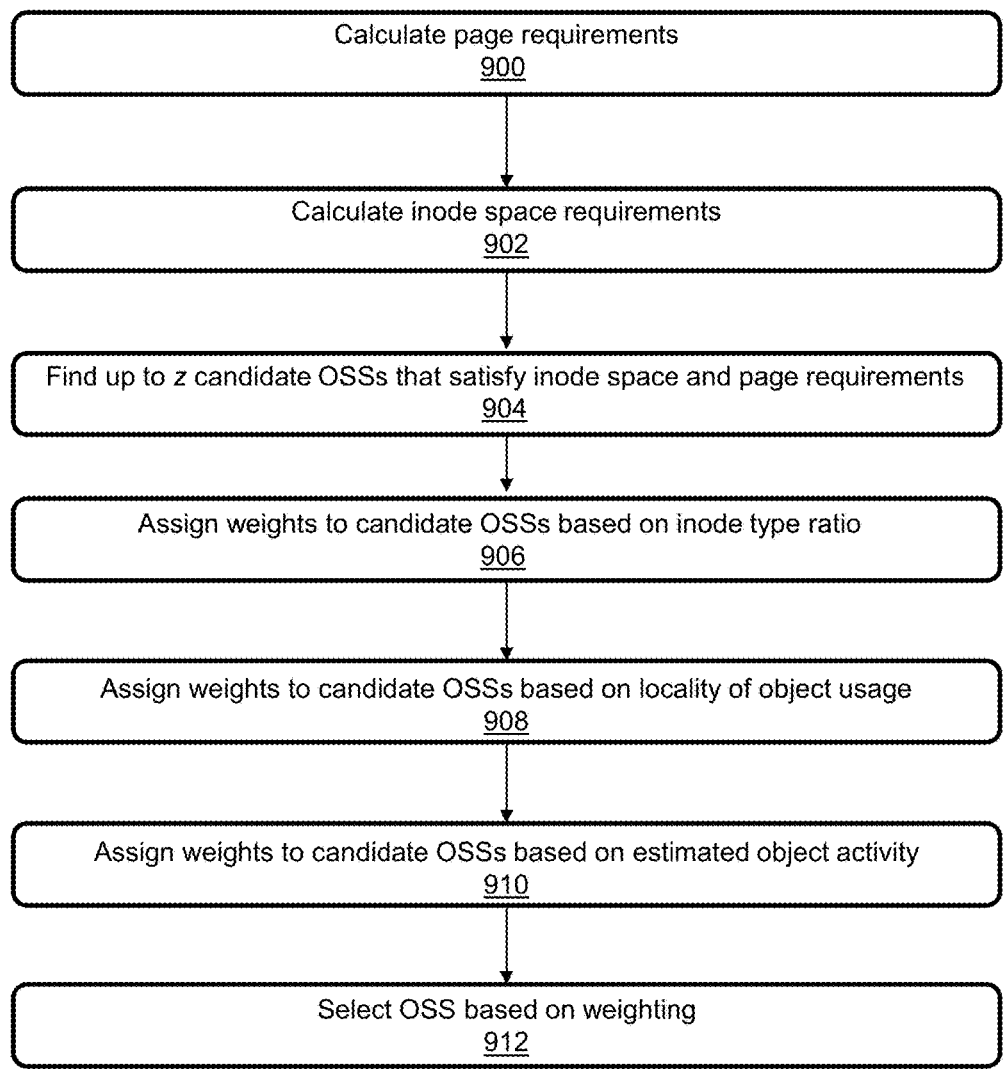
FIG. 9 illustrates OSS selection in greater detail.

FIG. 9 illustrates OSS selection (600, FIG. 6) in greater detail. An initial step 900 is to calculate page requirements. This may include one or more sub-calculations. For example, as a starting point the required number of TIDs can be calculated. The required number of TIDs can be used to calculate a required number of pages in metadata backing storage. Another step 902 is to calculate inode space requirements. The number of required pages can be used to calculate the required inodes of each type. There will typically be one Start inode, some number of Compact inodes, and some number of End inodes. If 1000 pages are required, for example, the inode set would require one Start inode, seven Compact inodes, and three End inodes (with pointers to 32, 32 and 8 pages respectively). Inode space requirements can be readily determined from the numbers of each type of required inode because inode size is known. Another step 904 is to find OSSs that satisfy the inode space and page requirements. As already mentioned above, an inode set is located in sequential locations in global memory. OSSs with insufficient sequential locations in global memory to host the inode set are passed over as candidates. A record of one or more of the largest "holes" in each OSS may be maintained to determine whether each OSS has sufficient sequential locations, where each "hole" record includes an indication of the length of an open sequential location in the OSS. The pyramid data structures associated with the OSSs can be used to determine whether OSSs satisfy page requirements. More particularly, the calculated page requirement is compared with the resource counts at the top level of the pyramid data structure and OSSs with insufficient free pages are passed over as candidates. Not all OSSs that satisfy the inode space and page requirements are equally suitable so multiple candidate OSSs are selected for consideration, where each selected candidate OSS satisfies the inode space and page requirements. However, the storage array may include many OSSs so the number of candidate OSSs considered may be limited to some predetermined number z.

Having created a set of candidate OSSs, various calculations are made to find the most suitable candidate OSS in the set of up to z candidates. In accordance with one aspect this includes assigning scores or weights to each candidate OSS based on one or more criteria. Some example criteria are described below.

At step 906 a first weight may assigned to each candidate OSS based on the effect that selection of that OSS would have on the balance of inode types in that OSS. As previously indicated, each OSS references a fixed-size Slice in metadata backing storage. If OSSs have a fixed-size in global memory it will be appreciated that OSS space usage is related to Slice space usage. Moreover, because Compact inodes and End inodes reference different numbers of pages per pointer, the ratio of different types of inodes affects space utilization efficiency. Depending on various implementation choices already mentioned above, utilization of OSS space in global memory will be balanced with, e.g., equal or approximate, utilization of Slice space in metadata backing storage at some known ratio of Compact inodes to End inodes. An imbalance with too many Compact inodes can result in exhaustion of Slice space before exhaustion of OSS space. An imbalance with too many End inodes can result in exhaustion of OSS space before exhaustion of Slice space. Assuming, for example, a target ratio of 1:1 (128s:1s), the weight is assigned to the candidate OSS based on the effect that selection of that OSS would have on the actual ratio of the OSS, e.g., 3:1. A selection that would achieve the target ratio, for example, would be weighted relatively heavily. A selection that would improve the actual ratio, for example from 3:1 to 2:1, would also be weighted relatively heavily. In contrast, a selection that would increase imbalance relative to the target ratio, for example from 3:1 to 4:1, would be weighted relatively lightly. It will not always be practical to achieve the target ratio, but in general the weighting or scoring helps to avoid OSS selections that would cause inefficient usage of resources.

At step 908 a second weight may assigned to each candidate OSS based on locality of object usage. As previously indicated, the metadata backing storage may be implemented as one or more devices (e.g., SSDs) on each director. In general, communications within a hardware subsystem such as a director are less time consuming than communications between hardware subsystems because, e.g., shared busses and buffering may be mitigated or avoided. Consequently, a director can typically access metadata from a local backing storage device more quickly than from a backing storage device in a different director. Because not all directors will have a local Slice mirror for the candidate OSS, some directors will access a Slice mirror via inter-director communications. It is sometimes possible to predict which director(s) are most likely to access an object. For example, there are different types of objects and different types of directors, and some object types can be correlated with some types of directors, e.g., a back-end object correlates with a back-end emulation director. If the object type associated with the OSS selection can be correlated with one or more directors then OSSs having Slice mirrors on those directors are weighted more heavily than OSSs which do not have Slice mirrors on those directors. In other words, candidate OSSs which are more likely to be locally accessed are favored.

At step 910 a third weight may assigned to each candidate OSS based on estimated object activity. Data activity is monitored for promotion and demotion of data in tiered storage. Moreover, hints can be generated which indicate actual or anticipated data activity. Metadata associated with active data may also be active, and hints may indicate which objects are likely to be more or less active, e.g. "hot," "warm," and "cold." The third weight is assigned in a manner which helps promote balanced activity levels in the various different metadata backing storage devices. Each metadata backing storage device can be characterized in terms of a ratio of the activity levels of hosted objects, e.g. hot:warm:cold. An imbalance with too many hot objects on one metadata backing storage device can be viewed as over-utilization of that device, whereas an imbalance with too many cold objects on one metadata backing storage device may be viewed as underutilization of that device. Such imbalances can be problematic because device performance may degrade as a result of high utilization. Such problems may be highlighted with asymmetric metadata backing storage devices such as SSDs which perform Write operations relatively slowly. The third weight is assigned based on how selection of that candidate OSS would affect the activity level balance of hosted objects in the metadata backing storage devices in which Slice mirrors are maintained. A selection that would achieve a target ratio of activity levels or improve the actual ratio of activity levels would be weighted relatively heavily. In contrast, a selection that would increase imbalance relative to the target ratio would be weighted relatively lightly. It will not always be practical to achieve the target ratio of activity levels on all metadata backing storage devices, but in general the weighting or scoring helps to promote balanced activity levels and avoid selections that would result in inefficient usage of resources by loading some devices much more heavily than other devices.

At step 912 the highest scoring or weighted candidate OSS is selected. The actual scores or weights used are implementation choices. Moreover, the relative importance of the various criteria is also an implementation choice. If the weighting/scoring is implemented such that candidates have equal scores or weights then selection from among those candidates may be random.

Figure 10:
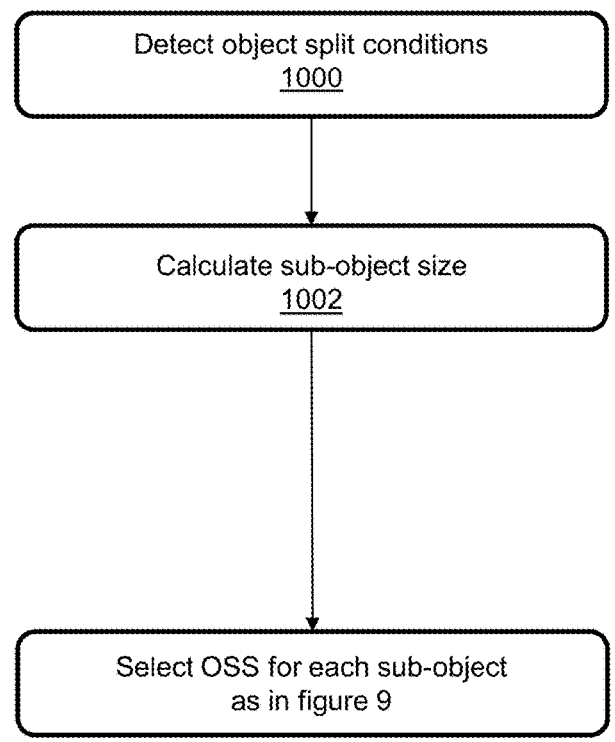
FIG. 10 illustrates object splitting.

FIG. 10 illustrates aspects of an object split operation. An initial step 1000 is to detect conditions which trigger an object split. An object split may be triggered by a wide variety of conditions. For example, an object split may be triggered based on the size of the object exceeding the fixed size of a Slice. However, some sub-Slice size may be selected as an object split size threshold because a slice full of big objects that take a large inode range each may not have a large enough inode range free for other big objects. So a max split size of 2.5% of the Slice, which would be 512 MB for a 20 GB Slice, is reasonable in one implementation to mitigate the negative effects from large inode ranges. A split size can be calculated dynamically if the user of an object is able to determine the sub-object ID (which includes split number) based only on the non-split object ID, the offset into the object and size, without lookups. An object split may also be triggered based on performance considerations. For example, it may be desirable to split and distribute large object across multiple backing storage devices. The sub-objects may be distributed, for example, on backing storage devices on particular directors based on considerations already mentioned above with regarding to weighting. In order to prepare to split an object that satisfies the conditions for a split as determined in step 1000, a candidate sub-object size is calculated in step 1002. For example, the candidate sub-object size may be calculated as half of the object size. A wide variety of factors may be considered in order to determine whether the candidate sub-object size is suitable. The user of an object must be able to determine the sub-object ID (which includes split number) based only on the non-split object ID, the offset into the object and size, without lookups. Moreover, the user should not be required to know how the sub-object was placed. A device's TID, for example, would be split into same-size TID sub-objects. An OSS is then independently selected for each sub-object as described with regard to FIG. 9, e.g., with each sub-object resulting from the split being treated like a separate object for purposes of OSS selection.

Figure 11:
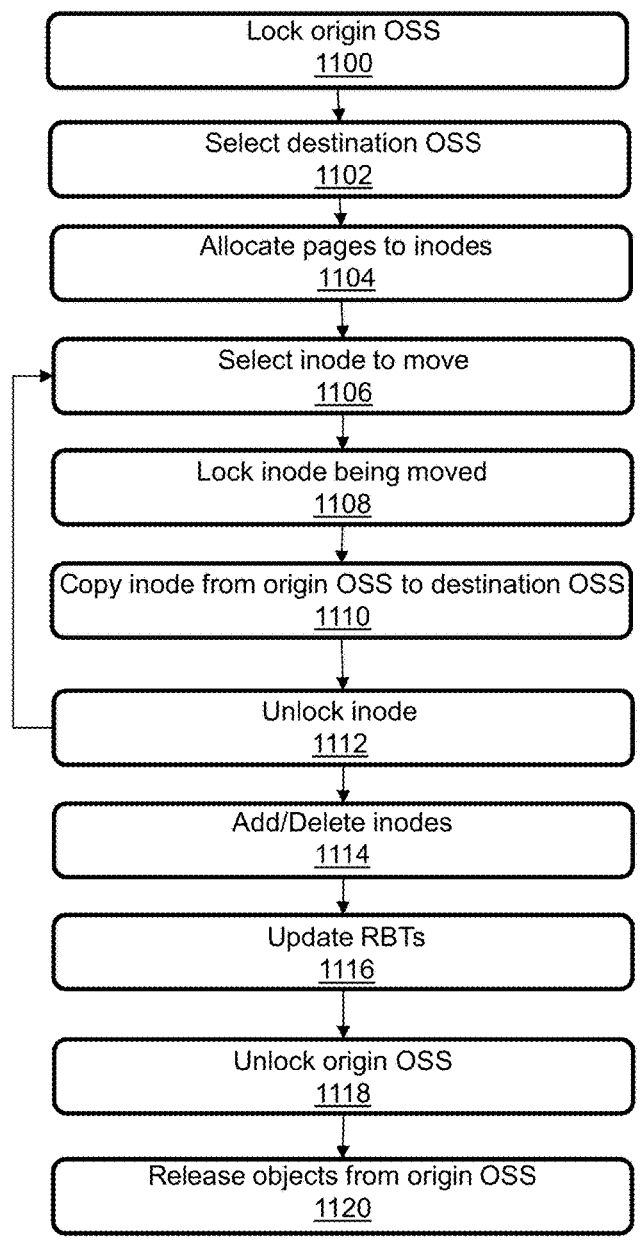
FIG. 11 illustrates adjustment of object location and size.

FIG. 11 illustrates aspects of adjusting object size and location. The technique is described in terms of an origin OSS and a destination OSS but it should be understood that the origin and destination may be within the same OSS. An initial step 1100 is to lock the origin OSS. The lock is not a generalized lock. For example, Read operations may be performed using the locked origin OSS. However, inode addition, deletion and relocation is not permitted within the locked origin OSS. The next step 1102 is to select a destination OSS. Selection of a destination OSS may be performed as described above with reference to FIG. 9. Moreover, if a split operation is occurring then the split operation may be performed as described above with reference to FIG. 10. Having selected a destination OSS, pages are allocated to inodes in the destination OSS in step 1104. Page allocation may include finding free pages via the pyramid data structure and inverting bits in the corresponding storage level bitmap. An inode in the inode set to be moved is then selected in step 1106, e.g., the Start inode in the origin OSS. The selected inode is then locked in step 1108. The inode lock is a Read as well as Write lock so Read and Write operations using the selected inode are briefly halted. The selected inode is then copied from the origin OSS to the destination OSS in step 1110. The corresponding pages in the origin Slice mirrors are also copied to the destination Slice mirrors. The Read and Write lock on the inode is then released in step 1112. Another inode in the set is then selected in step 1106, locked in step 1108, copied in step 1110, and unlocked in step 1112. The procedure continues iteratively until all of the inodes of the set have been copied to the destination OSS (or destination OSSs in the case of a split). Modes are then added or deleted in the destination OSS as appropriate in step 1114. It may be appropriate to add or delete inodes if the object size changes as part of the migration, e.g., due to a split. However, in some cases inodes will not be added or deleted. The RBTs are then updated as indicated in step 1116. This may include sending a message to all directors indicating the new location of the object. The origin OSS is then unlocked as indicated in step 1118. The objects are then released from the origin OSS as indicated in step 1120. This may include inverting bits in the storage level bitmap and flushing origin OSS inodes from global memory.

Figure 12:
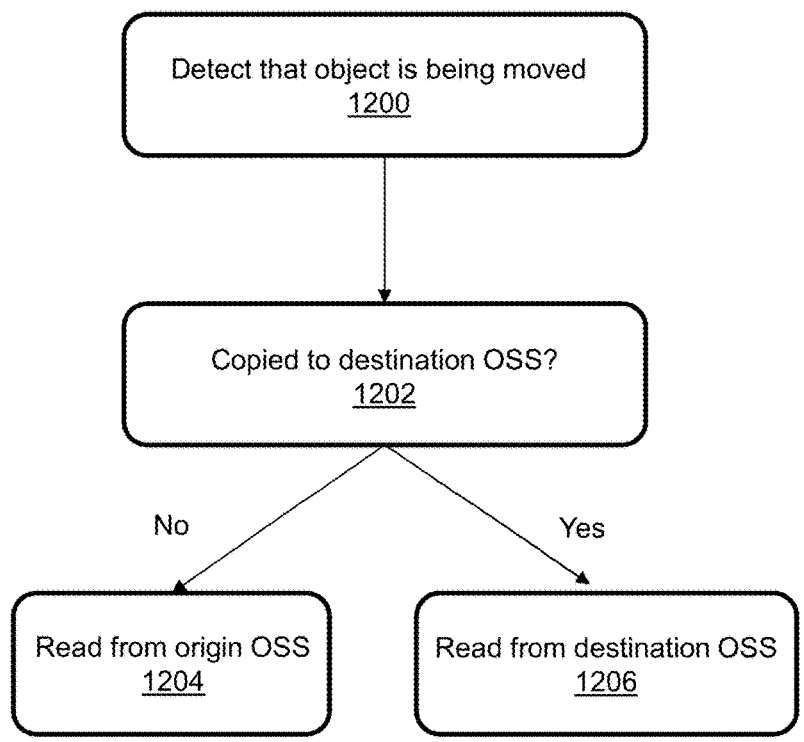
FIG. 12 illustrates object access proximate to object relocation.

FIG. 12 illustrates access during object migration. An initial step 1200 is detecting that the object is being moved. This may include detection of updated state settings. If the corresponding inode has not been copied to the destination OSS as determined in step 1202 then the inode is read from the origin OSS as indicated in step 1204. Consequently, the object is read from an origin metadata backing storage location. If the corresponding inode has been copied to the destination OSS as determined in step 1202 then the inode is read from the destination OSS as indicated in step 1206. Consequently, the object is read from a destination metadata backing storage location. If there is a Read and Write lock on the inode then the inode is read from the destination OSS once the inode has been copied to the destination OSS.

Some aspects may be associated with certain advantages, although none of the advantages are necessary to the inventive concepts. The separate pyramid data structures for each OSS can help avoid extensive locking by limiting locking scope to relatively small extents. For example, a lock may be limited in scope to one or more 128 bit regions of a storage level bitmap, each corresponding to 128 pages in the Slice. Moreover, the lock may be an allocation type lock so that other operations such as Reads are not locked out. This may help to facilitate contemporaneous addition of devices and resources while allowing other I/Os to be processed. Local resources such as the hash tables and RBT tables that are globally consistent and distributed also facilitate support of multiple concurrent users, even if the tables are loosely coupled and updated asynchronously. Moreover, table parallelism may improve performance via parallel access to the resources needed to find objects. The pyramid data structures tend to improve performance by facilitating efficient analysis and location of resources, and are also fault tolerant because they can be reconstructed from the metadata on the backing storage.

Some aspects, features and embodiments may comprise computer components and computer-implemented steps that will be apparent to those skilled in the art. For example, it should be understood by one of skill in the art that the computer-implemented steps may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a storage system comprising:
      a plurality of storage directors that utilize one or more physical non-volatile storage devices to present a logical storage device to at least one host, each storage director temporarily copying pages of metadata objects from the non-volatile storage devices into a shared memory which is accessible to all storage directors as needed to service input-output commands from the at least one host, each of the pages having an identical fixed-size and indicating locations of host data on the non-volatile storage devices, in which the storage directors:
      maintain a plurality of object storage systems in the shared memory, the object storage systems describing locations of associating pages of the metadata objects in the non-volatile storage devices, wherein each object storage system is uniquely associated with a same-size portion of the non-volatile storage devices, and wherein each object storage system comprises one or more sets of inodes with pointers to locations in the associated same-size portion of the non-volatile storage devices; and
      select one of the object storage systems to host a created metadata object based on sequential inode space availability in the shared memory and availability of space for pages of the created metadata object in the associated same-size portion of the non-volatile storage devices as indicated in the shared memory by the object storage systems.

2. The apparatus of claim 1 wherein the storage directors select the object storage system from a plurality of candidate object storage systems which each have enough sequential inode space and space for pages of metadata to host the object.

3. The apparatus of claim 2 wherein a first type of inode includes a pointer to a single page and a second type of inode includes a pointer to multiple pages, and wherein the candidate object storage systems are weighted based on associated numbers of inodes of the first and second types.

4. The apparatus of claim 2 wherein ones of the non-volatile storage devices are directly accessible by ones of the storage directors, and wherein each of the storage directors weights the candidate object storage systems based on likelihood of object access from a directly accessible non-volatile storage device.

5. The apparatus of claim 2 wherein ones of the non-volatile storage devices are directly accessible by ones of the storage directors, and wherein each of the storage directors weights the candidate object storage systems based on expected level of object activity such that balance of activity levels across non-volatile storage devices is promoted.

6. The apparatus of claim 1 wherein the object is split into sub-objects.

7. The apparatus of claim 6 wherein the sub-objects are hosted by different object storage systems.

8. A method comprising:
   in a storage array having a plurality of storage director directors that utilize one or more physical non-volatile storage devices to present a logical storage device to at least one host, each storage director temporarily copying pages of metadata objects from the non-volatile storage devices into a shared memory which is accessible to all storage directors as needed to service input-output commands from the at least one host, each of the pages having an identical fixed-size and indicating locations of host data on the non-volatile storage devices:
   maintaining a plurality of object storage systems in the shared memory, the object storage systems describing locations of pages of the metadata objects in the non-volatile storage devices, wherein each object storage system is uniquely associated with a same-size portion of the non-volatile storage devices, and wherein each object storage system comprises one or more sets of inodes with pointers to locations in the associated same-size portion of the non-volatile storage devices;
   selecting one of the object storage systems to host a created metadata object by:
      calculating how many pages are required;
      calculating required sequential inode space; and
      selecting one of the object storage systems based on sequential inode space availability in the shared memory and availability of space for pages of the created metadata object in the associated same-size portion of the non-volatile storage devices as indicated in the shared memory by the object storage systems.

9. The method of claim 8 further including selecting the object storage system from a plurality of candidate object storage systems which each have enough sequential inode space and availability of space for pages of metadata to host the object.

10. The method of claim 9 wherein a first type of inode includes a pointer to a single page and a second type of inode includes a pointer to multiple pages, and further weighting the candidate object storage systems based on how many inodes of the first and second types are associated with each candidate object storage system.

11. The method of claim 9 wherein ones of the non-volatile storage devices are directly accessible by ones of the storage directors, and further weighting the candidate object storage systems based on likelihood of object access from a directly accessible non-volatile storage device.

12. The method of claim 9 wherein ones of the non-volatile storage devices are directly accessible by ones of the storage directors, and further comprising weighting the candidate object storage systems based on expected level of object activity such that balance of activity levels across the non-volatile storage devices is promoted.

13. The method of claim 8 further comprising splitting the object into sub-objects.

14. The method of claim 13 further comprising hosting sub-objects in different object storage systems.

15. A method comprising:
    in storage system comprising a plurality of storage directors that utilize one or more physical non-volatile storage devices to present a logical storage device to at least one host, each storage director temporarily copying pages of metadata objects from the non-volatile storage devices into a shared memory which is accessible to all storage directors as needed to service input-output commands from the at least one host, each of the pages having an identical fixed-size and indicating locations of host data on the non-volatile storage devices and maintaining a plurality of object storage subsystems in the shared memory, the object storage subsystems describing locations of pages of the metadata objects in the non-volatile storage devices, each object storage subsystem being associated with a descriptive data structure that indicates availability of free space for pages of metadata objects for that object storage subsystem in the at least one backing storage device, creating an object by:

selecting at least one of the object storage subsystems from the plurality of object storage subsystems based on the descriptive data structure in the shared memory indicating sufficient free space to store the object;

updating the descriptive data structure; and transmitting an acknowledgment of object creation.

16. The method of claim 15 further including updating a searchable data structure to indicate location of the selected object storage subsystem in the shared memory.

\* \* \* \* \*